United States Patent
Inagaki (10) Patent No.: US 9,952,582 B2
(45) Date of Patent: Apr. 24, 2018

(54) METHOD OF CONTROLLING FEED AXES IN MACHINE TOOL, AND MACHINE TOOL PERFORMING MACHINING BY USING THE METHOD OF CONTROLLING FEED AXES

(71) Applicant: Okuma Corporation, Niwa-Gun (JP)

(72) Inventor: Hiroshi Inagaki, Niwa-Gun (JP)

(73) Assignee: Okuma Corporation, Niwa-Gun (JP)

( * ) Notice: Subject to any disclaimer, the term of this patent is extended or adjusted under 35 U.S.C. 154(b) by 308 days.

(21) Appl. No.: 14/841,859

(22) Filed: Sep. 1, 2015

(65) Prior Publication Data

US 2016/0114449 A1 Apr. 28, 2016

(30) Foreign Application Priority Data

Oct. 27, 2014 (JP) ................. 2014-218475

(51) Int. Cl.
- *B23Q 15/12* (2006.01)
- *G05B 19/404* (2006.01)
- *B23Q 17/09* (2006.01)

(52) U.S. Cl.
CPC .......... *G05B 19/404* (2013.01); *B23Q 15/12* (2013.01); *B23Q 17/0904* (2013.01); *B23C 2222/88* (2013.01); *B23C 2250/16* (2013.01); *G05B 2219/50318* (2013.01)

(58) Field of Classification Search
CPC .... G05B 2219/49177; G05B 2219/404; B23Q 15/12; B23Q 17/0904
See application file for complete search history.

(56) References Cited

U.S. PATENT DOCUMENTS

| 3,665,280 A | * | 5/1972 | Payne | .................... G05B 19/23 318/572 |
|---|---|---|---|---|
| 2008/0022818 A1 | * | 1/2008 | Hackh | .................... B23Q 23/00 82/147 |
| 2013/0268110 A1 | * | 10/2013 | Hamada | ............... G05B 19/404 700/192 |
| 2013/0309034 A1 | | 11/2013 | Inagaki et al. | |
| 2015/0063928 A1 | * | 3/2015 | Maeda | ...................... B23C 5/10 407/42 |
| 2017/0185064 A1 | * | 6/2017 | Masumiya | ............. G05B 19/27 |

FOREIGN PATENT DOCUMENTS

JP 2013-240837 A1 12/2013

* cited by examiner

*Primary Examiner* — Mohammad Ali
*Assistant Examiner* — Vincent W Chang
(74) *Attorney, Agent, or Firm* — Burr & Brown, PLLC (57) ABSTRACT

Maximum values of actual machining allowances of a workpiece in respective cutting flutes are averaged by control amounts of respective cutting flutes calculated by an arithmetic unit. The arithmetic unit converts the calculated control amounts into an amount in each axis direction and subtracts the value from a feed axis command value in an NC program stored in a storage unit. Then, a numeral value control unit performs machining by controlling respective feed axes based on the subtracted feed axis command value.

4 Claims, 6 Drawing Sheets

[MEASUREMENT VALUES OF RUNOUT AMOUNT OF CUTTING EDGE]

| (um) | FIRST FLUTE | SECOND FLUTE | THIRD FLUTE | FOURTH FLUTE |
|---|---|---|---|---|
| THIRD TIER | 12 | 12 | 17 | 0 |
| SECOND TIER | 10 | 7 | 25 | 7 |
| FIRST TIER | 5 | 0 | 30 | 5 |

[CALCULATION OF INCREMENT/DECREMENT OF ACTUAL ALLOWANCES]

| | | | | |
|---|---|---|---|---|
| THIRD TIER | 12 | 0 | 5 | −17 |
| SECOND TIER | 3 | −3 | 18 | −18 |
| FIRST TIER | 0 | −5 | 30 | −25 |

FIG. 5

[MEASUREMENT VALUES OF RUNOUT AMOUNT OF CUTTING EDGE]

| (um) | FIRST FLUTE | SECOND FLUTE | THIRD FLUTE | FOURTH FLUTE |
|---|---|---|---|---|
| THIRD TIER | 12 | 12 | 17 | 0 |
| SECOND TIER | 10 | 7 | 25 | 7 |
| FIRST TIER | 5 | 0 | 30 | 5 |

[CALCULATION OF INCREMENT/DECREMENT OF ACTUAL ALLOWANCES]

| | | | | |
|---|---|---|---|---|
| THIRD TIER | 12 | 0 | 5 | −17 |
| SECOND TIER | 3 | −3 | 18 | −18 |
| FIRST TIER | 0 | −5 | 30 | −25 |

[CALCULATION OF CONTROL AMOUNTS]

| CONTROL AMOUNTS | 9.0 | 6.3 | 24.0 | 4.0 |
|---|---|---|---|---|

[CALCULATION OF RUNOUT AMOUNTS OF CUTTING EDGE AFTER CONTROL]

| | | | | |
|---|---|---|---|---|
| THIRD TIER | 3.0 | 5.7 | −7.0 | −4.0 |
| SECOND TIER | 1.0 | 0.7 | 1.0 | 3.0 |
| FIRST TIER | −4.0 | −6.3 | 6.0 | 1.0 |

[CALCULATION OF INCREMENT/DECREMENT OF ACTUAL ALLOWANCES AFTER CONTROL]

| | | | | |
|---|---|---|---|---|
| THIRD TIER | 7.0 | 2.7 | −12.7 | 3.0 |
| SECOND TIER | −2.0 | −0.3 | 0.3 | 2.0 |
| FIRST TIER | −5.0 | −2.3 | 12.3 | −5.0 |

FIG. 6

[MEASUREMENT VALUES OF RUNOUT AMOUNT OF CUTTING EDGE]

| (um) | FIRST FLUTE | SECOND FLUTE | THIRD FLUTE | FOURTH FLUTE |
|---|---|---|---|---|
| THIRD TIER | 12 | 12 | 17 | 0 |
| SECOND TIER | 10 | 7 | 25 | 7 |
| FIRST TIER | 5 | 0 | 30 | 5 |

[CALCULATION OF INCREMENT/DECREMENT OF ACTUAL ALLOWANCES]

| | FIRST FLUTE | SECOND FLUTE | THIRD FLUTE | FOURTH FLUTE |
|---|---|---|---|---|
| THIRD TIER | 12 | 0 | 5 | −17 |
| SECOND TIER | 3 | −3 | 18 | −18 |
| FIRST TIER | 0 | −5 | 30 | −25 |

[CALCULATION OF CONTROL AMOUNTS]

| CONTROL AMOUNTS | 0.0 | −6.3 | 17.5 | −5.8 |
|---|---|---|---|---|

[CALCULATION OF RUNOUT AMOUNTS OF CUTTING EDGE AFTER CONTROL]

| | FIRST FLUTE | SECOND FLUTE | THIRD FLUTE | FOURTH FLUTE |
|---|---|---|---|---|
| THIRD TIER | 12.0 | 18.3 | −0.5 | 5.8 |
| SECOND TIER | 10.0 | 13.3 | 7.5 | 12.8 |
| FIRST TIER | 5.0 | 6.3 | 12.5 | 10.8 |

[CALCULATION OF INCREMENT/DECREMENT OF ACTUAL ALLOWANCES AFTER CONTROL]

| | FIRST FLUTE | SECOND FLUTE | THIRD FLUTE | FOURTH FLUTE |
|---|---|---|---|---|
| THIRD TIER | 6.3 | 6.3 | −18.8 | 6.3 |
| SECOND TIER | −2.8 | 3.3 | −5.8 | 5.3 |
| FIRST TIER | −5.8 | 1.3 | 6.3 | −1.8 |

METHOD OF CONTROLLING FEED AXES IN MACHINE TOOL, AND MACHINE TOOL PERFORMING MACHINING BY USING THE METHOD OF CONTROLLING FEED AXES

BACKGROUND OF THE INVENTION

This application claims the benefit of Japanese Patent Application Number 2014-218475 filed on Oct. 27, 2014, the entirety of which is incorporated by reference.

FIELD OF THE INVENTION

The present invention relates to a method of controlling feed axes in a machine tool in order to suppress generating of chatter vibration and chipping of a tool by controlling the feed axes in consideration of runout amounts in cutting edges of the tool during machining by the machine tool, particularly, during heavy cutting of a hard-to-cut material such as titanium alloy. The present invention also relates to a machine tool performing cutting by using the method of controlling feed axes.

DESCRIPTION OF RELATED ART

When the hard-to-cut material is machined by milling, a tool, to which detachable cutting edges called "Throwaway" or "Insert" are attached, is used for reducing machining costs. The heights of the attached cutting edges are not uniform in this tool due to the effect of machining accuracy in an attachment bearing surface of the cutting edges of the tool itself and in the cutting edge itself, and therefore runout amounts (relative installation errors between respective cutting edges) are generated. In the case of the cutting edge with a large runout amount, chipping of the tool occurs and a tool lifetime is reduced. Accordingly, the present inventors have provided the invention in Japanese Patent Application Publication No. 2013-240837 (JP-A-2013-240837). In JP-A-2013-240837, an amplitude and a phase are set based on respective positions of cutting edges and previously measured runout amounts, and feed axes are slightly displaced in an opposite direction of a machining advancing direction in synchronization with a main spindle so as to cancel the runout amounts, so that one-cutting edge feed amount of each cutting edge is made close to an originally designated value to suppress chipping of a tool.

SUMMARY OF THE INVENTION

In the machining method of JP-A-2013-240837, when machining is performed by using the tool having a plurality of cutting edges (a plurality of cutting edge tiers) in one cutting flute, the amount of operating the feed axes in the opposite direction of machining is set to an average value of the runout amounts in respective cutting edge tiers measured in one cutting flute as the runout amount varies in respective cutting edges. However, it is difficult to obtain a sufficient tool lifetime as the runout amount does not become minimum with the average value. As a countermeasure for the above, it is considered that there is a method of calculating control amounts, for example, by using a solver function of a spreadsheet application so that actual machining allowances in respective cutting edges are averaged. However, since the value is converged in this method by repeatedly performing calculation for obtaining the maximum solution, it is necessary to execute the method a plurality of times and it takes time, and a calculation formula becomes complicated.

In view of the above, an object of the present invention is to provide a method of controlling feed axes in a machine tool and the machine tool capable of obtaining a control amount in which maximum values of actual machining allowances are averaged by simple calculation and capable of increasing the lifetime of the tool.

According to a first aspect of the present invention, there is provided a method of controlling feed axes in a machine tool, wherein the machine tool machines a workpiece by rotating a tool that includes a plurality of tiers having a plurality of cutting edges arranged on concentric circles in the axis direction. The method includes steps of calculating increment or decrement of machining allowances of a workpiece to be actually machined by respective cutting edges based on previously measured runout amounts of the cutting edges, calculating control amounts whereby maximum values of the machining allowances in respective cutting flutes are averaged, and superimposing control of slightly displacing the feed axes in an opposite direction of machining while machining is performed, based on the control amounts.

In the above structure according to a second aspect of the present invention, a control amount $R_i$ is calculated by the following procedures.

When a subscript for a number of the cutting flute is "i" ($1 \le i \le Z$, Z: the number of cutting edges), a subscript for a tier number of the cutting edges in each cutting flute is "j" ($1 \le j \le N$, N: the number of tiers of cutting edges used in actual machining in the cutting flute), and the measured runout amount of each cutting edge is $C_{i,j}$ (μm), increment or decrement $D_{i,j}$ in the actual machining allowance in each cutting edge can be calculated by the following formula (1).

$$D_{i,j} = C_{i,j} - C_{i-1,j} \qquad (1)$$

(when i−1 is 0(zero), it is replaced with Z)

Next, the control amount $R_i$ is calculated by the following formula (2) when $R_1=0$, $R_i$=(maximum value from $D_{i,1}$ to $D_{i,j}$)−{value obtained by dividing the sum total of (the maximum values from $D_{i,1}$ to $D_{i,j}$) in each cutting flute "i" by the number of cutting edges Z}+$R_{i-1}$ (2)

According to a third aspect of the present invention, there is provided a machine tool that machines a workpiece by rotating a tool that includes a plurality of tiers each having a plurality of cutting edges arranged on concentric circles in the axial direction. The machine tool includes a control value calculation unit for calculating increment or decrement of machining allowances of a workpiece to be actually machined by respective cutting edges based on previously measured runout amounts of the cutting edges and calculating control amounts whereby the maximum values of the machining allowances in respective cutting flutes are averaged and a control unit for superimposing control of slightly displacing feed axes in an opposite direction of machining while machining is performed, based on the control amounts.

In the structure according to a fourth aspect of the present invention, a control amount $R_i$ is calculated by the following procedures.

When a subscript for a number of the cutting flute is "i" ($1 \le i \le Z$, Z: the number of cutting edges), a subscript for a tier number of the cutting edges in each cutting flute is "j" ($1 \le j \le N$, N: the number of tiers of cutting edges used in actual machining in the cutting flute), and the measured runout amount of each cutting edge is $C_{i,j}$ (μm), increment or decrement $D_{i,j}$ in the actual machining allowance in each cutting edge can be calculated by the following formula (1).

$$D_{i,j}=C_{i,j}-C_{i-1,j} \quad (1)$$

(when i−1 is 0(zero), it is replaced with Z)

Next, the control amount $R_i$ is calculated by the following formula (2) when $R_1=0$, $R_i$=(maximum value from $D_{i,1}$ to $D_{i,j}$)−{value obtained by dividing the sum total of (the maximum values from $D_{i,1}$ to $D_{i,j}$) in each cutting flute "i" by the number of cutting edges Z}+$R_{i-1}$ (2)

According to the present invention, the runout amounts of the tool in respective axes directions corresponding to the tool position (rotation angle) are corrected in the feed axes side during machining not by complicated calculation method requiring time but by simple calculation. Therefore, the control amounts whereby the maximum values of actual machining allowances are averaged are obtained. Accordingly, the machining can be performed while suppressing the effect of the runout amounts of the tool, which increases the lifetime of the tool.

DESCRIPTION OF EMBODIMENTS

Hereinafter, an embodiment of the present invention will be explained with reference to the drawings.

Figure 1:
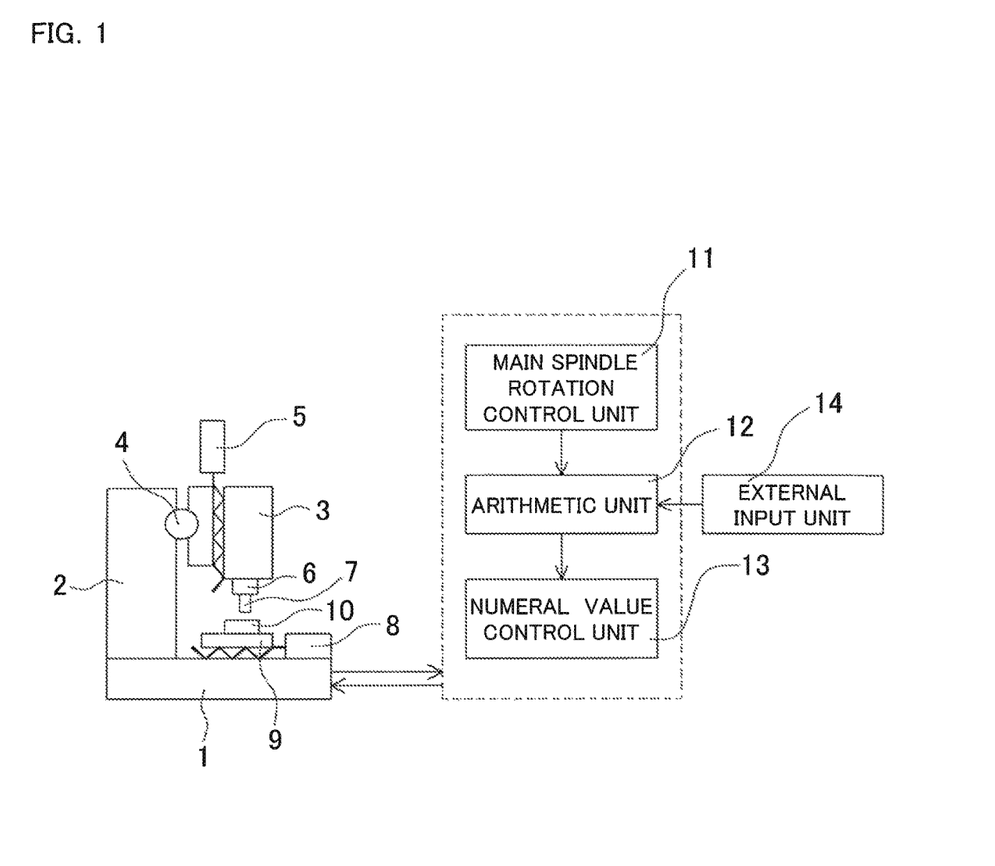
FIG. 1 is a structural view showing an example of a machine tool.

FIG. 1 is a structural view showing an example of a machine tool which executes a method of controlling feed axes according to the present invention. In the drawing, 1 denotes a bed, 2 denotes a column. A spindle head 3 is provided in front of the column 2 so as to be controlled to move in an X-axis direction and a Z-axis direction by an X-axis control unit 4 and a Z-axis control unit 5. A tool 7 is attached to a main spindle 6 provided under the spindle head 3 so as to face downward. A table 9 which can be controlled to move in a Y-axis direction by a Y-axis control unit 8 is provided above the bed 1, and a workpiece 10 can be fixed on the table 9.

A control system of the machine tool includes a main spindle rotation control unit 11 controlling a rotation speed of the main spindle 6, an arithmetic unit 12 calculating control amounts of the feed axes (respective control units 4, 5 and 8), a numeral value control unit 13 controlling the feed axes and a storage unit (not shown). Later-described runout amounts in cutting edges of the tool 7 can be inputted into the arithmetic unit 12 by an external input unit 14.

Figure 2:
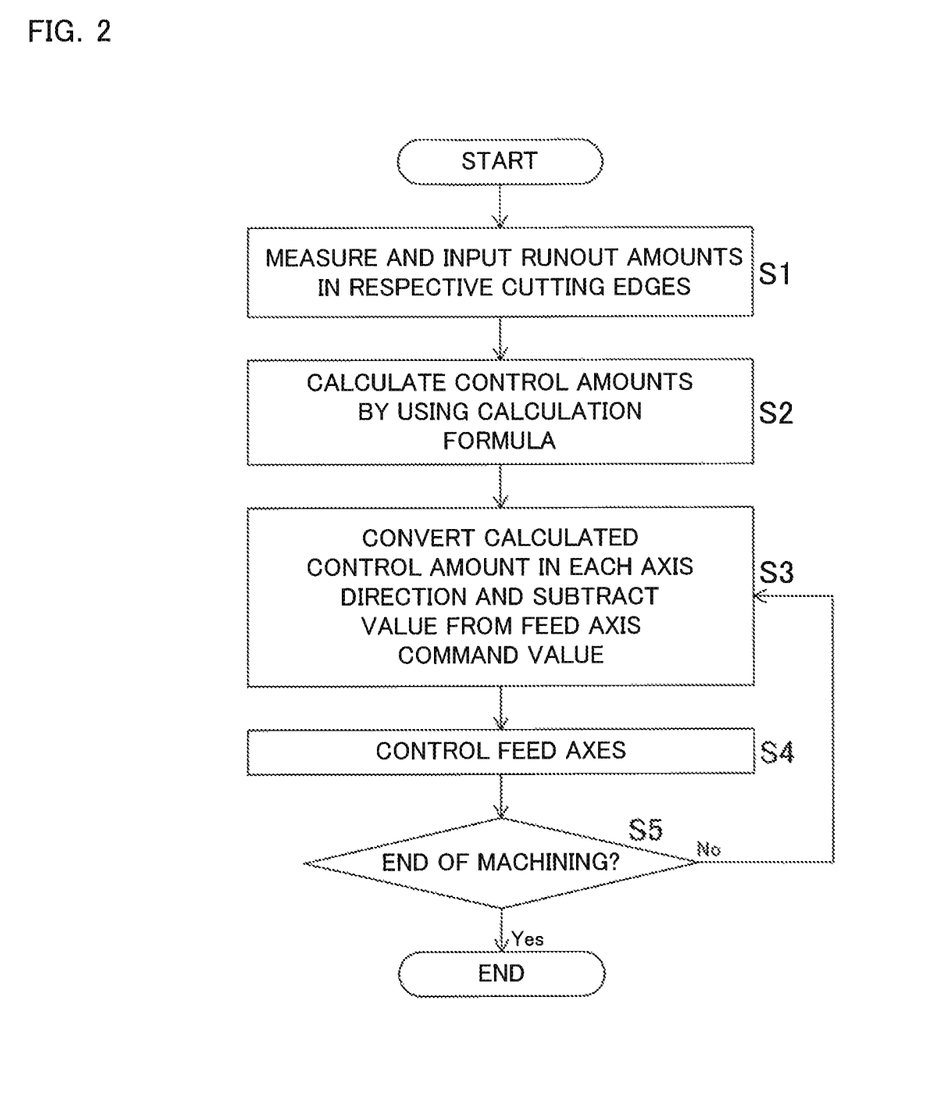
FIG. 2 is a flowchart of a method of controlling feed axes.
Figure 3:
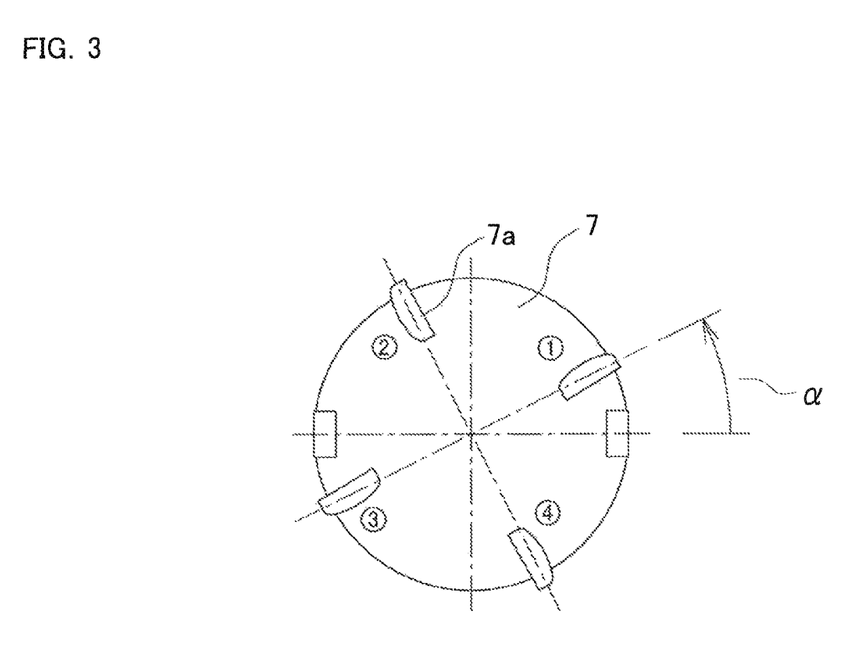
FIG. 3 is a horizontal cross-sectional view of a tool.

In the machine tool having the above configuration, machining is performed based on a flowchart of FIG. 2. As shown in FIG. 3, the tool 7 is formed by providing three tiers each having four pieces of cutting edges 7a, 7a . . . provided at intervals of 90 degrees on concentric circles at given intervals in the axial direction. The cutting edges 7a in each flute (numbers enclosed within circles shown in FIG. 3) in the axial direction are attached so that the cutting edges 7a are sequentially shifted from a tip end of the tool 7 to the front side in the rotation direction, that is, three cutting edges 7a, 7a . . . are arranged in a helix direction in respective flutes of the numbers 1 to 4 enclosed within circles.

First, runout amounts in respective cutting edges 7a of the tool 7 are measured and inputted to the arithmetic unit 12 in advance through the external input unit 14 in S1. The arithmetic unit 12 calculates the control amounts of respective cutting flutes in a rotation angle by using a given calculation formula in S2. The calculation of the control amount is performed in the following manner.

First, when a subscript for a number of the cutting flute is "i" (1≤i≤Z, Z: the number of cutting edges), a subscript for a tier number of the cutting edges 7a in each cutting flute is "j" (1≤j≤N, N: the number of tiers of cutting edges used in actual machining in the cutting flute), and the measured runout amount of each cutting edge is $C_{i,j}$ (µm), increment or decrement $D_{i,j}$ in the actual machining allowance in each cutting edge can be calculated by the following formula (1).

$$D_{i,j}=C_{i,j}-C_{i-1,j} \quad (1)$$

However, when i−1 is 0(zero), it is replaced with Z.

That is, the size of the runout amount in each cutting edge 7a does not correspond to the actual machining allowance in each cutting edge 7a, and the difference of the runout amounts in respective cutting edges 7a (increment or decrement) corresponds to the difference in actual machining allowances. The greater the difference in the cutting edge 7a is, the faster the chipping progresses and the shorter the lifetime, therefore, the values are calculated.

Then, a control amount $R_i$ in each cutting flute is calculated by the following formula (2).

When $R_1=0$, $R_i$=(maximum value from $D_{i,1}$ to $D_{i,j}$)−{value obtained by dividing the sum total of (the maximum values from $D_{i,1}$ to $D_{i,j}$) in each cutting flute "i" by the number of cutting edges Z}+$R_{i-1}$ (2)

The calculation formula means that the maximum value of the actual allowance in the cutting flute is not smaller than an average value of the maximum values calculated in respective cutting flutes.

As a position of the control (tool rotation angle), an average value of a rotation angle (α in FIG. 3) from a position (reference position) where the runout amounts in respective tiers of the cutting flute are measured to, for example, rotation angles of only the cutting edges 7a used for actual machining is used. A phase relation between each position of the cutting edge 7a and the body of the tool 7 may be grasped by an encoder connected to the main spindle 6. The main spindle rotation control unit 11 obtains the phase information of the cutting edge 7a based on the output of the encoder.

When the control amount $R_i$ in each cutting flute is calculated, the arithmetic unit 12 converts the control amount calculated in S2 into an amount in each axis direction and subtracts the value from a feed axis command value in an NC program stored in the storage unit in S3. Then, the numeral value control unit 13 performs machining by controlling respective feed axes (control units) based on the subtracted feed axis command value in S4. For example, in the machining in an X-Y plane, the control amount calculated with respect to the machining advancing direction is distributed to the X-axis and Y-axis directions and the feed axes are controlled in the opposite direction of machining. The processing in S3 and S4 is repeated until the machining ends in S5.

Due to the above control, minute forced vibration is superimposed with respect to the feeding operation. However, as the forced vibration has a frequency equal to the runout of the tool 7, the vibration can be superimposed on the feeding axes so as to suppress the runout amounts of the tool 7 in one rotation of the main spindle 6, which can act so as to cancel the effect of the runout amounts in the tool. As a result, the maximum cutting power acting on the cutting edges 7a is reduced to thereby reduce the ratio of occurrence of chipping of the tool. This also leads to the suppression of chatter vibration by reducing the maximum cutting power.

Figure 4:
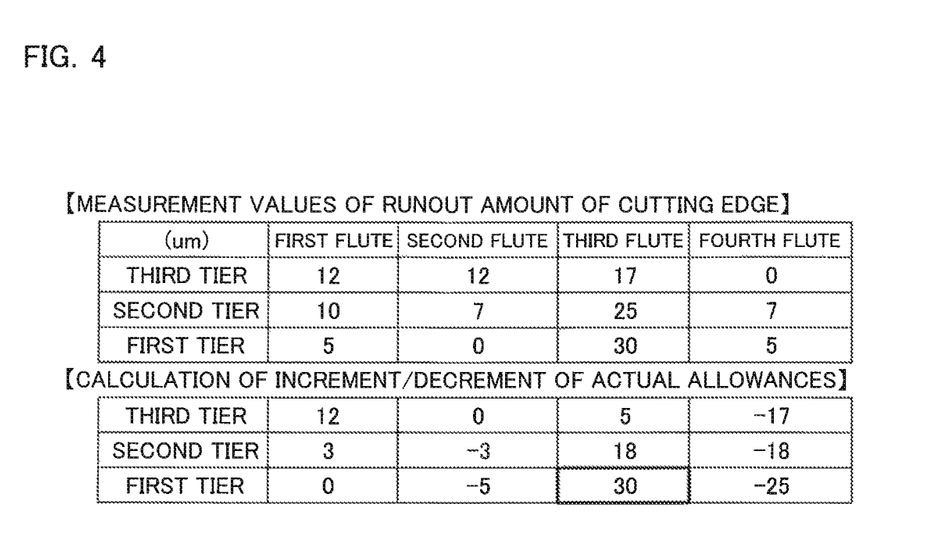
FIG. 4 shows measurement results of runout amounts of respective cutting edges and calculation results of increment or decrement of actual allowances when machining is performed by using cutting edges in four flutes with three tiers per flute.

FIG. 4 shows measured values of the runout amounts of respective cutting edges and calculated values of increment or decrement of the actual machining allowances when it is assumed that the tool having cutting edges in four flutes with three tiers per flute is used. In this case, the cutting edge with the relatively largest machining allowance is one in the first tier of the third flute (a portion surrounded by thick lines), which is 30 μm.

Figure 5:
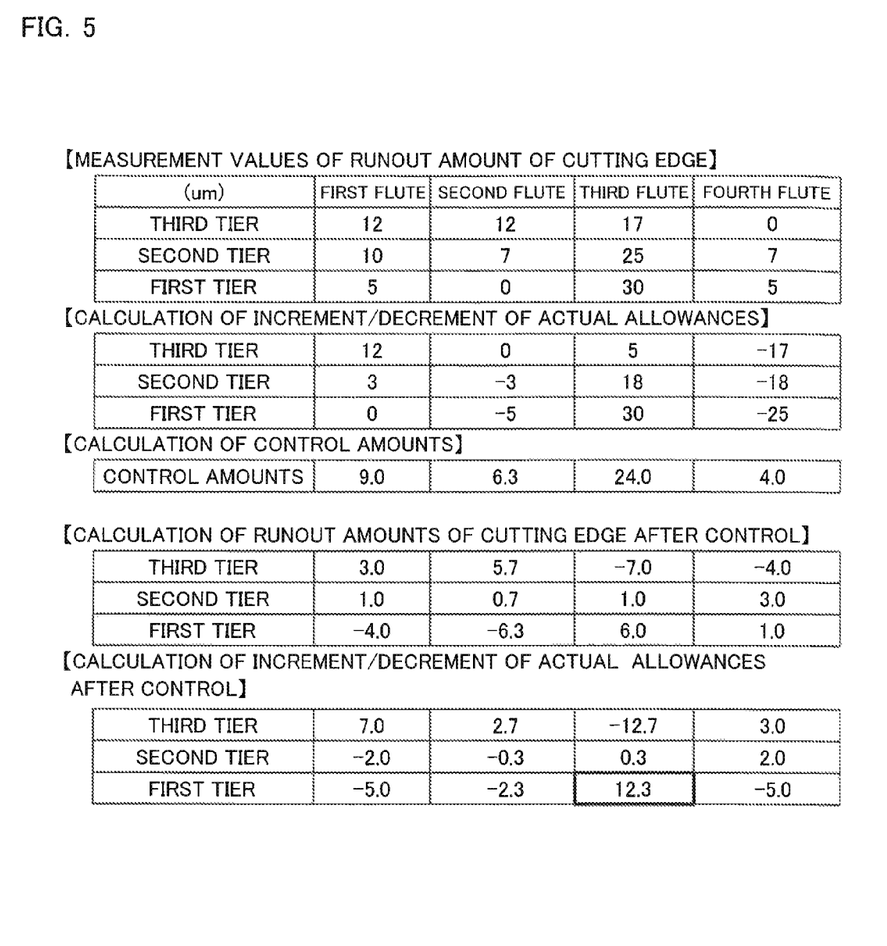
FIG. 5 shows measurement results of runout amounts of respective cutting edges and calculation results of increment or decrement of actual allowances when machining is performed by using cutting edges in four flutes with three tiers per flute, and calculation results obtained when average values of runout amounts of a tool are used as control amounts.

FIG. 5 shows calculated values obtained when an average value of runout amounts of cutting edges in each tier measured in one cutting flute is set as a control amount, calculated values of runout amounts of cutting edges obtained when being controlled based on the calculated values and calculated values of increment or decrement of actual machining allowances. In this case, the cutting edge with the relatively largest machining allowance is one in the first tier of the third flute (a portion surrounded by thick lines), which is 12.3 μm.

Figure 6:
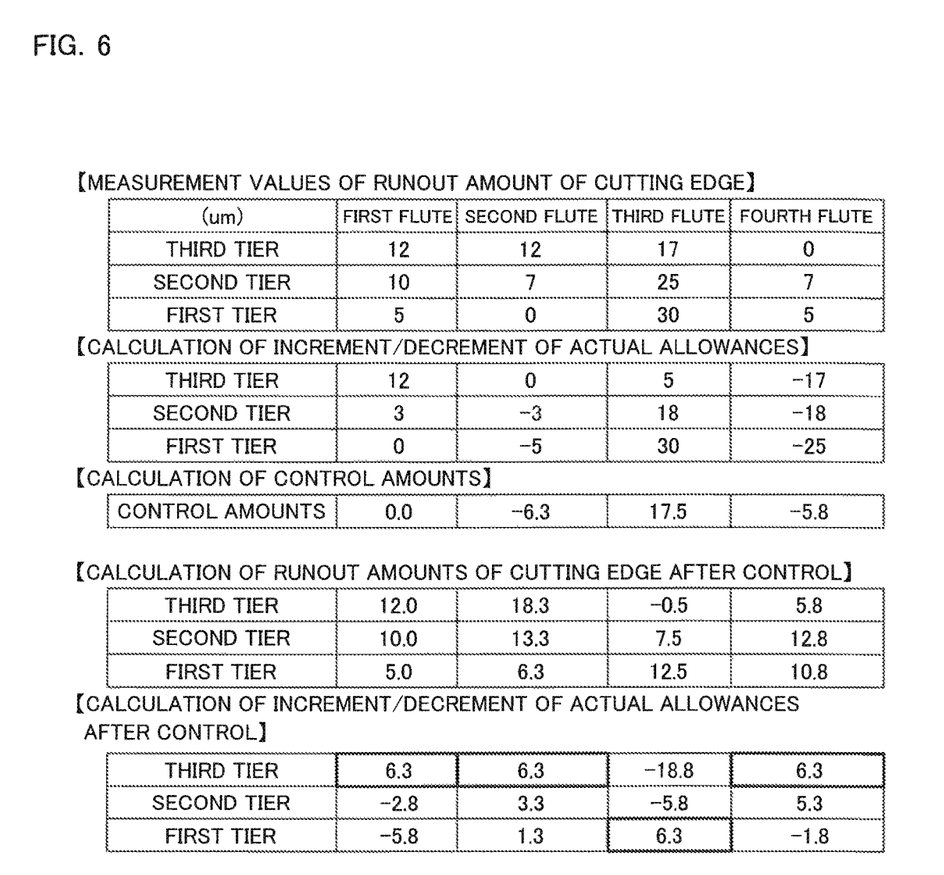
FIG. 6 shows measurement results of runout amounts of respective cutting edges and calculation results of increment or decrement of actual allowances when machining is performed by using cutting edges in four flutes with three tiers per flute, and calculation results of control amounts in which the maximum values of actual allowances are averaged.

On the other hand, FIG. 6 shows control amounts calculated by the above calculation formula, calculated values of runout amounts of cutting edges obtained when being controlled based on the control amounts and calculated value of increment or decrement of actual machining allowances. In this case, the cutting edges with the relatively largest machining allowance are increased to four points (more averaged), the allowance of which is 6.3 μm (portions surrounded by thick lines), that is, the effect of runout amounts is almost cancelled. The result almost corresponds to the result of analysis by the solver function of the spreadsheet application.

As described above, when the machine tool executing the method of controlling the feed axes according to the embodiment is used, the runout amounts of the tool in respective axes directions corresponding to the tool position (rotation angle) are corrected in the feed axes side during machining not by complicated calculation method requiring time but by simple calculation. As a result, the control amounts whereby the maximum values of actual machining allowances are averaged are obtained. Accordingly, the machining can be performed while suppressing the effect of the runout amounts of the tool, which increases the lifetime of the tool 7.

The number of tiers of cutting edges and the number of cutting edges in one tier in the tool are not limited to the above, which can be appropriately increased or decreased. The types of machine tools are not particularly limited as long as machining is performed by controlling the feed axes while rotating the tool in which a plurality of tiers each having a plurality of cutting edges are arranged on concentric circles in the axial direction, and the invention can be applied to, for example, combined machining equipment, a machining center and so on.

It is explicitly stated that all features disclosed in the description and/or the claims are intended to be disclosed separately and independently from each other for the purpose of original disclosure as well as for the purpose of restricting the claimed invention independent of the composition of the features in the embodiments and/or the claims. It is explicitly stated that all value ranges or indications of groups of entities disclose every possible intermediate value or intermediate entity for the purpose of original disclosure as well as for the purpose of restricting the claimed invention, in particular as limits of value ranges.

What is claimed is:

1. A method of controlling feed axes in a machine tool, wherein
   the machine tool machines a workpiece by rotating a tool, the tool including a plurality of tiers having a plurality of cutting edges arranged on concentric circles in an axis direction,
   the method comprising steps of:
   calculating increment or decrement of machining allowances of a workpiece which is actually machined by respective cutting edges based on previously measured runout amounts of the cutting edges;
   calculating control amounts to control the feed axes whereby maximum values of the machining allowances in respective cutting flutes are averaged; and
   superimposing control of displacing the feed axes in an opposite direction of machining while machining is performed, based on the control amounts.

2. The method of controlling feed axes in the machine tool according to claim 1,
   wherein a control amount $R_i$ is calculated by the following procedures: when a subscript for a number of the cutting flute is "i" ($1 \leq i \leq Z$, Z: the number of cutting edges), a subscript for a tier number of the cutting edges in each cutting flute is "j" ($1 \leq j \leq N$, N: the number of tiers of cutting edges used in actual machining in the cutting flute), and the measured runout amount of each cutting edge is $C_{i,j}$ (μm), increment or decrement $D_{i,j}$ in the actual machining allowance in each cutting edge can be calculated by the following formula (1):

$$D_{i,j} = C_{i,j} - C_{i-1,j} \qquad (1)$$

(when i−1 is 0(zero), it is replaced with Z)
   next, the control amount $R_i$ is calculated by the following formula (2) when $R_1 = 0$, $R_i$=(maximum value from $D_{i,1}$ to $D_{i,j}$)−{value obtained by dividing the sum total of (the maximum values from $D_{i,1}$ to $D_{i,j}$) in each cutting flute "i" by the number of cutting edges Z}+$R_{i-1}$     (2).

3. A machine tool which machines a workpiece by rotating a tool which includes a plurality of tiers each having a plurality of cutting edges arranged on concentric circles in the axial direction, the machine tool comprising:
   a control value calculation unit for calculating increment or decrement of machining allowances of a workpiece which is actually machined by respective cutting edges based on previously measured runout amounts of the cutting edges and calculating control amounts to control feed axes whereby the maximum values of the machining allowances in respective cutting flutes are averaged; and a control unit for superimposing control of displacing the feed axes in an opposite direction of machining while machining is performed, based on the control amounts.

4. The machine tool according to claim 3, wherein a control amount $R_i$ is calculated by the following procedures:

when a subscript for a number of the cutting flute is "i" ($1 \leq i \leq Z$, Z: the number of cutting edges), a subscript for a tier number of the cutting edges in each cutting flute is "j" ($1 \leq j \leq N$, N: the number of tiers of cutting edges used in actual machining in the cutting flute), and the measured runout amount of each cutting edge is $C_{i,j}$ (m), increment or decrement $D_{i,j}$ in the actual machining allowance in each cutting edge can be calculated by the following formula (1):

$$D_{i,j} = C_{i,j} - C_{i-1,j} \quad (1)$$

(when i−1 is 0(zero), it is replaced with Z)

next, the control amount $R_i$ is calculated by the following formula (2) when $R_1 = 0$, $R_i$=(maximum value from $D_{i,1}$ to $D_{i,j}$)−{value obtained by dividing the sum total of (the maximum values from $D_{i,1}$ to $D_{i,j}$) in each cutting flute "i" by the number of cutting edges Z}+$R_{i-1}$ \quad (2).

* * * * *